Feb. 27, 1940. C. B. McELWAINE 2,192,141
PRESSURE REGULATING VALVE
Filed June 17, 1937
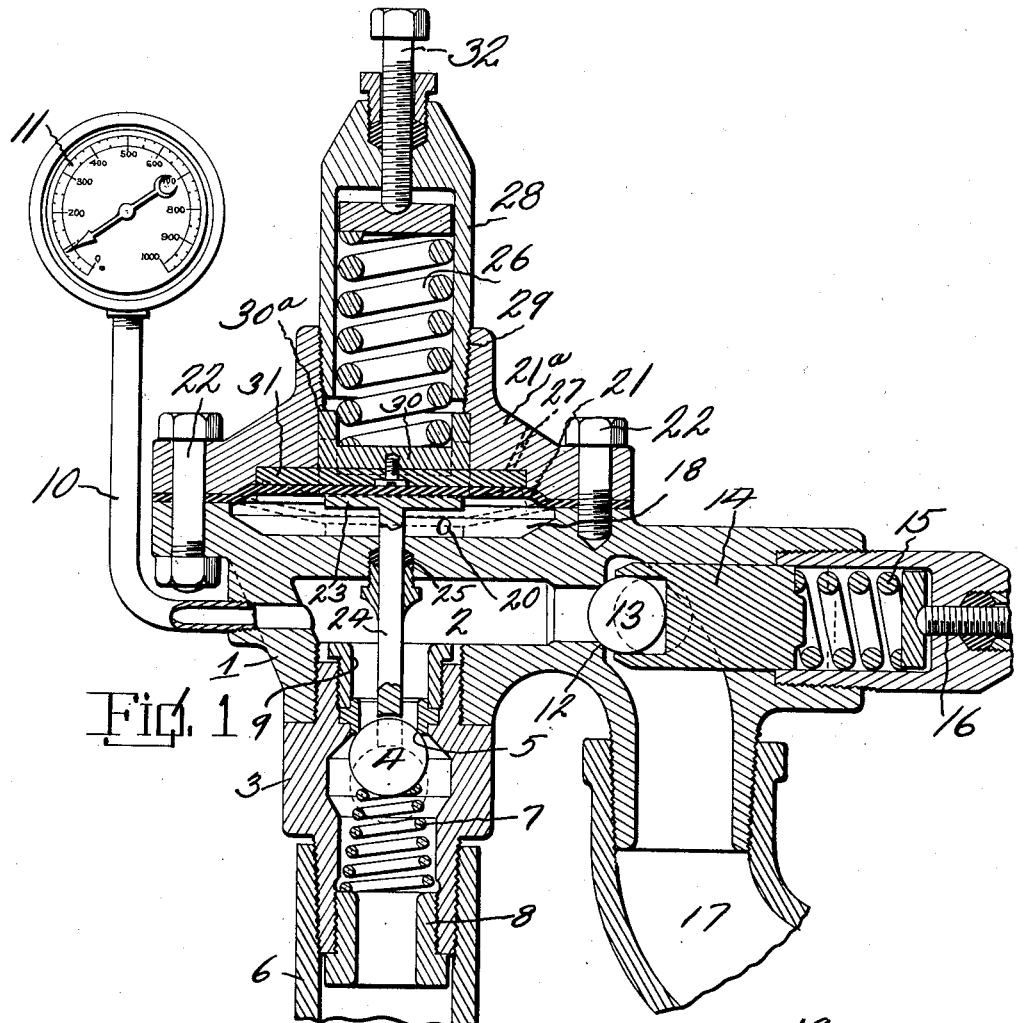
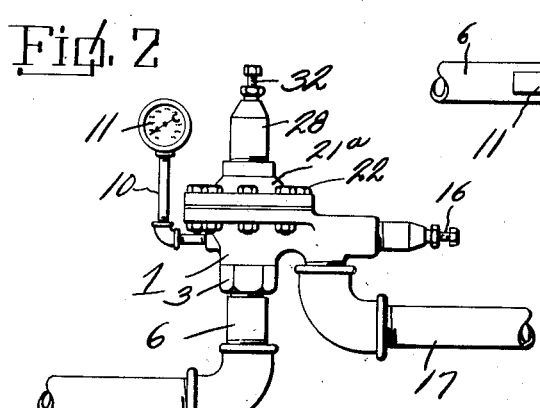
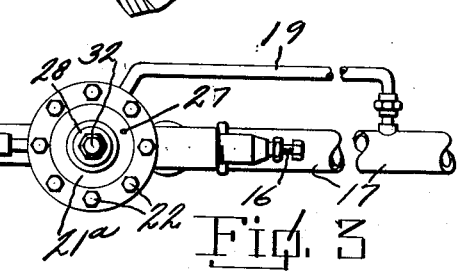
Clayton B. McElwaine
INVENTOR
BY Philip A. H. Terrell
ATTORNEY Patented Feb. 27, 1940

2,192,141

UNITED STATES PATENT OFFICE 2,192,141

PRESSURE REGULATING VALVE

Clayton B. McElwaine, Tulsa, Okla., assignor of fifty-one per cent to Henry N. Greis, Tulsa, Okla.

Application June 17, 1937, Serial No. 148,805

2 Claims. (Cl. 50—23)

The invention relates to pressure regulators, particularly adapted for use in connection with gas pipe lines, and has for its object to provide a device of this character wherein upon reduction of pressure on the lower pressure side of the regulator, additional gas pressure will be allowed to pass through the regulator for building up the pressure on the lower pressure side to a predetermined pressure.

A further object is to provide a reduction pressure chamber intermediate valves controlling the flow of gas from the high to the low pressure side and in which a predetermined pressure is maintained until reduction of pressure on the low pressure side, and at which time gas is fed from the intermediate chamber to the low pressure side and additional gas from the high pressure side is allowed to enter the intermediate chamber and build up the pressure therein to the predetermined amount.

A further object is to provide a diaphragm chamber having a diaphragm therein, and in communication with the low pressure side of the regulator for supplying a predetermined pressure beneath the diaphragm against the action of an expansion spring and a shaft actuated downwardly by the diaphragm and cooperating with the valve controlling the inflow of high pressure to the intermediate chamber when there is loss of pressure on the low pressure side of the regulator.

A further object is to provide a spring resisted valve cooperating with a discharge port from the intermediate chamber, and which valve is unseated upon loss of pressure on the low pressure side and/or upon the unbalancing of pressures in the regulator.

A further object is to provide the flexible diaphragm with a yieldable packing disc, against which the expansible spring actuated member engages, said disc preventing cutting of the diaphragm under the various pressures, and preventing blow out of the diaphragm and leakage.

A further object is to provide a diaphragm backed by a compressible disc, which in turn is backed by a spring actuated member of limited upward movement, whereby its limit of travel is accomplished before the elastic limit of the diaphragm is reached.

A further object is to provide a regulator valve mechanism comprising a casing having a low pressure side, a high pressure side, an intermediate pressure chamber between the low and high pressure sides, spring and pressure balance valves controlling the flow of gas into and from the intermediate chamber and a diaphragm control means controlled by pressure on the low pressure side for opening the valve on the high pressure side upon reduction of pressure on the low pressure side, thereby building up the pressure in the intermediate chamber and on the low pressure side.

A further object is to provide means whereby the regulator may be adjusted for varying the amount of pressure on the low pressure side, hence the pressure beneath the diaphragm and the pressure maintained in the intermediate chamber, thereby allowing the regulator to be adjusted for various pressure ratios.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical longitudinal sectional view through the regulator.

Figure 2 is a side elevation of the regulator.

Figure 3 is a top plan view through the regulator.

Referring to the drawing, the numeral 1 designates the casing of the regulator, which casing is provided with an intermediate gas chamber 2, in which a predetermined constant gas pressure is maintained during the operation of the regulator. Connected to the casing 1 is a check valve casing 3 having a ball check valve 4 therein. The ball check valve 4 cooperates with a valve seat 5 and is normally maintained seated by pressure in the high pressure line 6 and by a helical spring 7, which is preferably weak, and of sufficient expansive power to maintain the ball valve 4 seated without any pressure on the under side thereof.

In the following description, specific gas pressures are set forth, in various parts of the regulator. However, it is to be understood that these specific pressures are for illustrative purposes only, and they may be changed as desired. The high pressure supply is at three hundred pounds through the supply pipe 6, and the gas passes through the bushing 8, carried by the check valve casing 5, and maintains the spherical valve 4 seated. Threaded into the upper end of the check valve casing 3 is a bushing 9, which holds the valve seat member 5 in position, and through which bushing the gas passes under certain conditions to the intermediate gas chamber 2, where it is maintained, for instance at one hundred pounds pressure. Connected to the regulator casing 1 and in communication with the intermediate chamber 2 is a pipe 10, which leads to a conventional form of pressure gage 11. One end of the intermediate chamber 2 is provided with a valve seat 12, with which a ball valve 13 cooperates. The ball valve 13 is carried by the inner end of a slidable plunger 14, which is forced inwardly by an expansion spring 15, which, in the present instance, exerts a pressure of one hundred pounds on the ball valve 13. This pressure can be varied by adjusting the screw 16 inwardly or outwardly. Ball valve 13 controls the flow of gas from the intermediate chamber 2 to the lower pressure side or pipe 17 on the demand side of the regulator, and in which pipe a pressure of ten pounds is maintained. The lower pressure pipe 17 is cross connected with a diaphragm chamber 18, through the by-pass pipe 19 and port 20, leading into the chamber 18. Therefore, it will be seen that if the pressure is ten pounds on the low side of the regulator, per square inch, a hundred pound pressure will be maintained against the under side of diaphragm 21 having a ten square inch area.

Secured on the upper side of the regulator casing 1 and forming part of the diaphragm chamber 18, is a bonnet 21a, and clamped between the bonnet 21a and the casing 1, by means of bolts 22, are the marginal edges of the diaphragm 21. The diaphragm 21 contacts the disc 23 of the ball valve unseating rod 24, which extends downwardly through a packing gland 25, thence through the intermediate chamber 2 and terminates adjacent the upper side of the ball check valve 4, so that when there is a loss of pressure in the diaphragm chamber 18 and the rod 24 is forced downwardly under the influence of the expansion spring 26, the ball 4 will be unseated and additional pressure allowed to enter the intermediate chamber 2 for building up pressure therein and replacing the gas and pressure previously discharged therefrom into the low pressure pipe 17, incident to a downward falling of the pressure on the demand side of the regulator. As the pressure builds up in the pipe 17 to the predetermined ten pounds per square inch, it is transmitted to the diaphragm chamber 18, which again forces the diaphragm 21 upwardly, overcoming the spring 26 to the extent of ten pounds pressure per square inch, or one hundred pounds total under the diaphragm. The spring in the example used is set for a pressure of three hundred pounds, and as it is opposed to the extent of one hundred pounds in the diaphragm chamber 18, it will be noted it exerts a downward pressure of two hundred pounds. However, when there is loss of pressure in the diaphragm chamber 18, the three hundred pound pressure spring gradually becomes more effective, forcing the push rod 24 downwardly and its three hundred pound pressure will then unseat check valve 4 against the three hundred pound pressure in the high pressure pipe 6 and allow additional gas pressure to enter the intermediate chamber 2 and build up the pressure therein to one hundred pounds.

When this building up of the pressure in the intermediate chamber 2 reaches one hundred pounds, the spring resisted valve 13 opens, building the pressure on the lower side pipe 17 to its predetermined setting of ten pounds. Consequently there is a building up of pressure in the diaphragm chamber 18 to a predetermined pressure of ten pounds per square inch. This will force the diaphragm upwardly, and allow the valve 4 to again seat. This operation continues from time to time as there is a falling of pressure on the lower pressure or demand side of the regulator.

The bonnet 21a is preferably provided with a breather aperture 27, which allows freedom of movement of the diaphragm 21 in its upward and downward movement by allowing ingress and egress of air above the diaphragm. The expansion spring 26 is disposed in a chambered member 28, threaded at 29 in the upper end of the bonnet and engages the slidable cup 30, to which is secured a compressible disc 31 forming a cushioning and packing means for preventing leakage, the blowing of parts of the diaphragm between movable parts, for instance around cup 30, which has a movable and slidable fit in the bottom, incident to pressure or the cutting of the diaphragm on the edges of movable parts. It will be noted that slidable cup 30 has a limited range of movement, particularly upward, when it engages the shoulder 30a. This limited movement prevents excessive stretching of the diaphragm during its operation and prevents fracture or breaking thereof, incident to said stretching. The diaphragm stopping takes place before the elastic limit of the diaphragm is reached. The expansive power of the spring 26 may be varied by adjusting the adjusting screw 32, which cooperates with the upper end of the spring.

From the above it will be seen that a regulator mechanism is provided whereby the pressure on the low side of the regulator may be constantly maintained at a predetermined pressure, and the pressure between the high side of the regulator and the low side stepped downwardly through an intermediate chamber, and the initial feeding of high pressure gas from the high side of the regulator is controlled by the fall of gas pressure on the low or demand side of the regulator, and the pressure on the low side is automatically built up and maintained at the predetermined pressure. It will also be seen that the movement of the diaphragm is stopped before its elastic limit is reached, thereby preventing damage to the diaphragm and that the compressible backing disc will prevent blow out of the diaphragm around the cup 30 and relief aperture 27.

The invention having been set forth what is claimed as new and useful is:

1. The combination with a regulator valve comprising a casing having a chamber therein in which a predetermined pressure is maintained, an intake valve controlling the flow of fluid to the chamber on the high pressure side, diaphragm control means cooperating with said valve and controlled from the low pressure side of the valve for building up pressure in the chamber, a discharge port carried by the casing and leading to the chamber, of a check valve cooperating with the discharge port and forming means whereby the amount of pressure maintained in said chamber may be varied a valve seat carried by the discharge port, said check valve comprising a plunger slidably mounted in the casing and cooperating with the valve seat and an adjustable expansion spring means cooperating with the plunger and forcing the same towards the valve seat.

2. A device as set forth in claim 1 wherein the plunger and discharge ports are in the plane of the chamber.

CLAYTON B. McELWAINE.